(12) United States Patent
Shantha et al.

(10) Patent No.: US 8,226,228 B2
(45) Date of Patent: Jul. 24, 2012

(54) COOLING AND HEATING EYEGLASSES

(76) Inventors: Totada R Shantha, Stone Mountain, GA (US); Jessica Shantha, Stone Mountain, GA (US)

( * ) Notice: Subject to any disclaimer, the term of this patent is extended or adjusted under 35 U.S.C. 154(b) by 0 days.

(21) Appl. No.: 13/210,387

(22) Filed: Aug. 16, 2011

(65) Prior Publication Data
US 2011/0299027 A1 Dec. 8, 2011

(51) Int. Cl.
*G02C 11/08* (2006.01)
(52) U.S. Cl. .......................................... 351/62; 351/158
(58) Field of Classification Search .................. 351/63, 351/41, 158, 62; 362/103
See application file for complete search history.

(56) References Cited

U.S. PATENT DOCUMENTS

| | | | | |
|---|---|---|---|---|
| 4,254,451 A | * | 3/1981 | Cochran, Jr. | 362/103 |
| 6,715,873 B2 | * | 4/2004 | Nahmias | 351/44 |
| 7,648,234 B2 | * | 1/2010 | Welchel et al. | 351/62 |

* cited by examiner

*Primary Examiner* — Hung Dang
(74) *Attorney, Agent, or Firm* — Patwrite LLC; Mark David Torche

(57) ABSTRACT

Cooling and heating eyeglasses have peltier chips mounted around at least a portion of the perimeter of the lenses that provides a cooling affect that reduces eyestrain and provides cooling relief to the user. A battery pack provides the electrical energy needed to energize the peltier chips. The battery pack is connected to a neck strap that allows the user to comfortably support the batteries. In another embodiment, a plurality of smaller batteries are used and disposed within the frame eliminating the need for an external battery pack. In another embodiment, side shields are also provide with peltier chips to further control the temperature especially around the user's eyes. Because the peltier can also provide heating, a user can also select heating if preferred. The cooling and heating glasses can be used for prevention and treatment of several eye diseases and oculopathies.

6 Claims, 7 Drawing Sheets

COOLING AND HEATING EYEGLASSES

BACKGROUND OF THE INVENTION

It is estimated that over 75% of the United States population wears some sort of corrective eyewear and glasses are the most common. We have records of magnification lenses in early Egyptian hieroglyphs back in the 5th century BCE. Although glasses are a great invention and have allowed people to see better, they do have some drawbacks. Eyestrain and headaches can be caused by wearing the glasses especially when worn while using a computer.

It is well known to provide cooling to the head area and specifically around the eyes to give relief from eyestrain and headaches. Ice bags, chemical cold packs, cool washcloth and other means of providing cooling to the head area are used to provide this cooling relief. Although these methods often provide relief, they are not easy to use and generally require the user to interrupt their activity and apply the cold to the affected area. Furthermore, many eye diseases are due to excessive production of reactive oxygen species generating free radicals resulting in many known eye diseases (oculopathies). It is known that cooling of biological structures reduces the production of free radicals which can damage the eye and vision.

There is a need for glasses that not only provide corrective vision, but also provide the user with relief from eyestrain and headaches and use cooling to reduce and prevent the development of eye diseases.

SUMMARY OF THE INVENTION

Cooling and heating eyeglasses have peltier chips mounted around at least a portion of the perimeter of the lenses that provides a cooling affect that reduces eyestrain and provides cooling relief to the user. A battery pack provides the electrical energy needed to energize the peltier chips. The battery pack is connected to a neck strap that allows the user to comfortably support the batteries. In another embodiment, a plurality of smaller batteries are used and disposed within the frame eliminating the need for an external battery pack. In another embodiment, side shields are also provide with peltier chips to further control the temperature especially around the user's eyes. Because the peltier can also provide heating, a user can also select heating if preferred. The cooling and heating glasses can be used for prevention and treatment of several eye diseases and oculopathies.

Other features and advantages of the instant invention will become apparent from the following description of the invention which refers to the accompanying drawings.

DETAILED DESCRIPTION OF THE INVENTION

Figure 1:
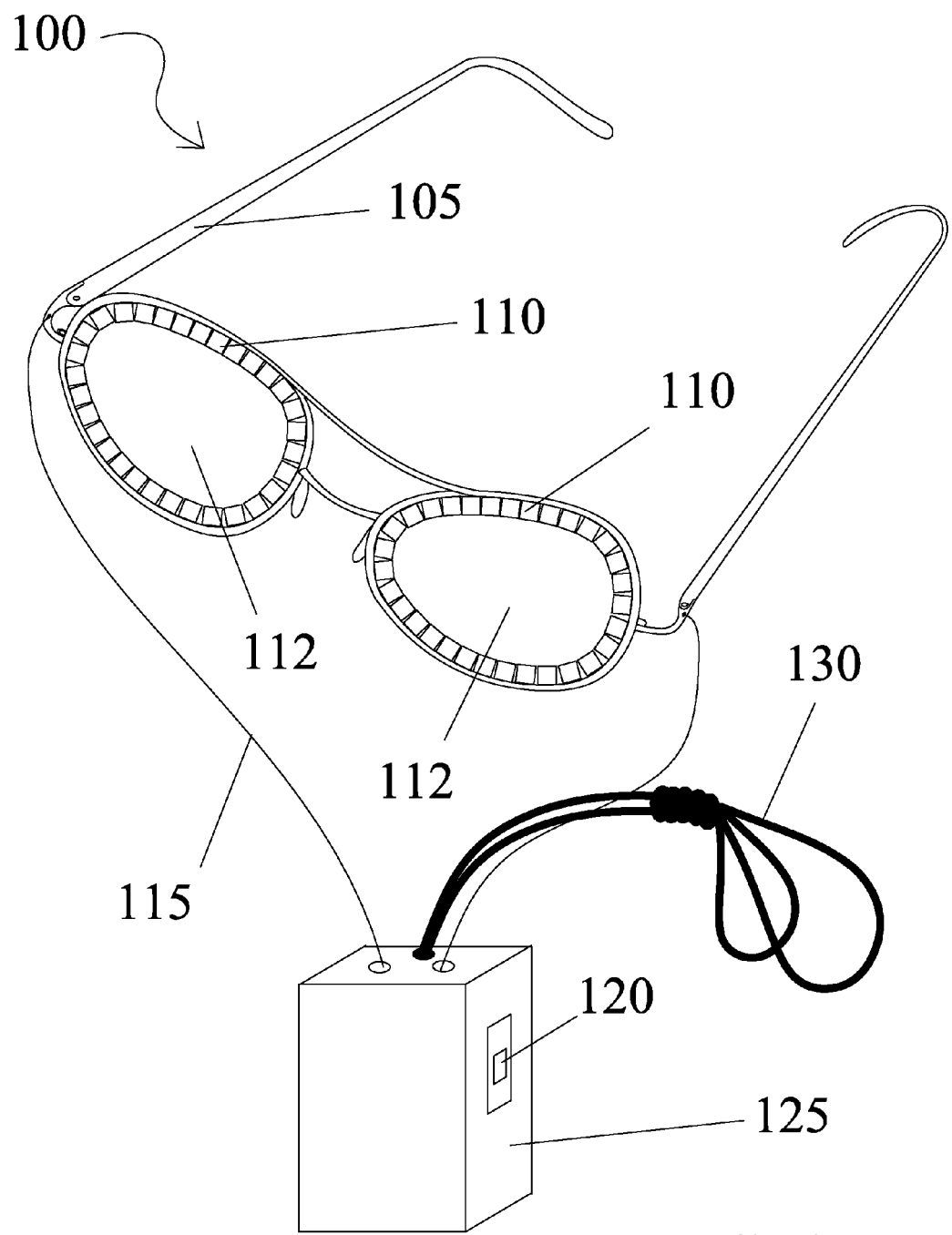
FIG. 1 is an illustration of cooling and heating eyeglasses according to an embodiment of the invention having a separate power conductor and neck strap.

In the following detailed description of the invention, reference is made to the drawings in which reference numerals refer to like elements, and which are intended to show by way of illustration specific embodiments in which the invention may be practiced. It is understood that other embodiments may be utilized and that structural changes may be made without departing from the scope and spirit of the invention.

Referring now to FIG. 1, cooling and heating eyeglasses 100 is shown having a frame 105 which houses a pair of lenses 112. Lenses 112 have a plurality of peltier chips 110 around a perimeter therein. A battery pack 125 provides the electrical energy necessary to energize the peltier chips 110. A switch 120 is provided to control the cooling and heating properties of the chips. Electrical conductors 115 are used to transmit the electrical energy to peltier chips 110. A neck strap 130 allows the user to comfortably support battery pack 125. In use, the user simply wears cooling and heating glasses 100 and switches it on. Peltier chips 110 are energized and produce a cooling region around the user's eyes.

Figure 2:
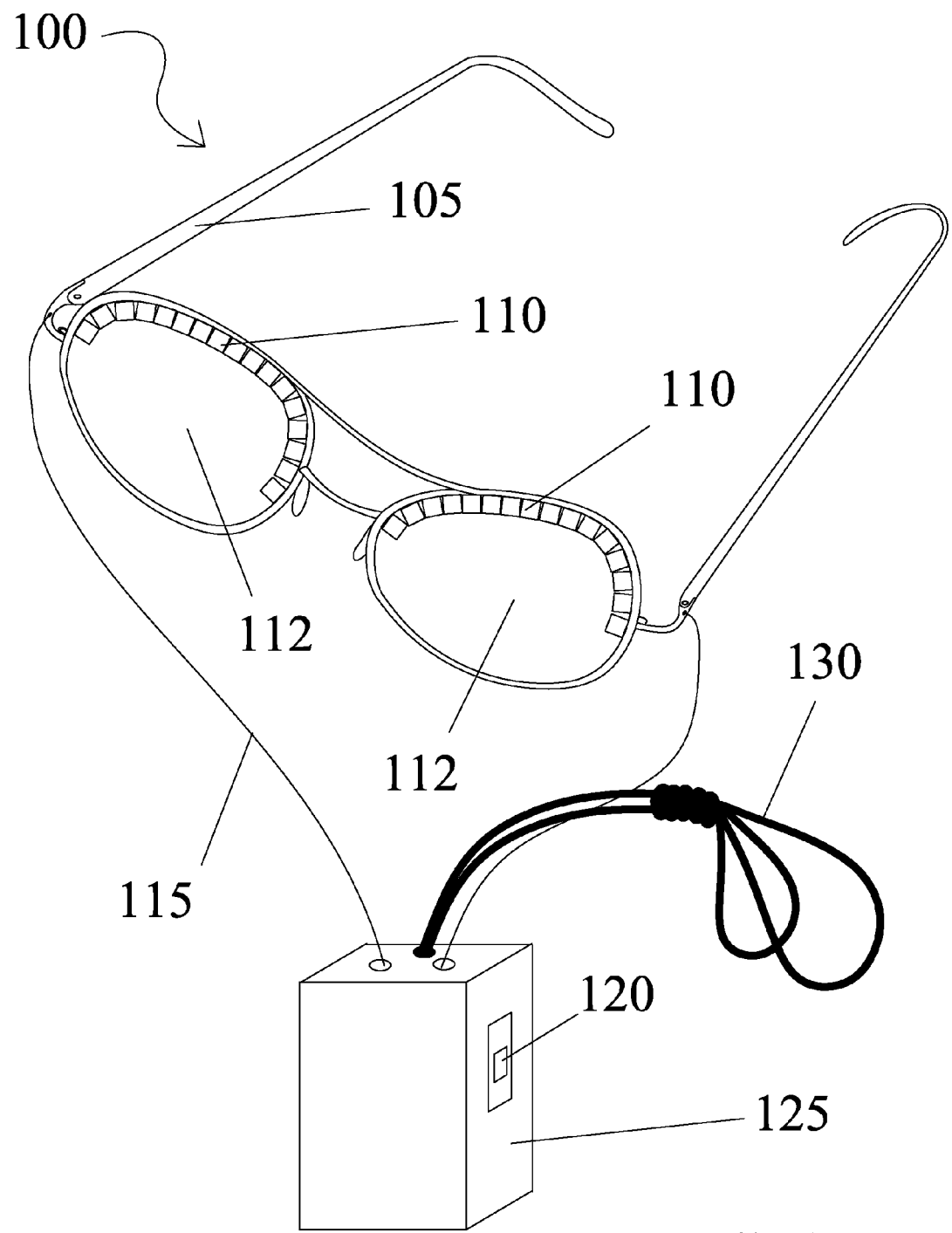
FIG. 2 is an illustration of cooling and heating eyeglasses according to an embodiment of the invention having peltier chips disposed along an upper perimeter of the lenses.

Referring now to FIG. 2, cooling and heating eyeglasses 100 is shown having frame 105 which houses lenses 112. Lenses 112 have a plurality of peltier chips 110 around an upper portion of a perimeter therein. As discussed above, battery pack 125 provides the electrical energy necessary to energize peltier chips 110. Switch 120 is provided to control the cooling and heating properties of the chips. Electrical conductors 115 are used to transmit the electrical energy to peltier chips 110. Neck strap 130 allows the user to comfortably support battery pack 125. Again, in use, the user simply wears cooling and heating glasses 100 and switches it on. Peltier chips 110 are energized and produce a cooling region around the user's eyes. Because cooler air tends to sink, the entire eye region is cooled in this embodiment while reducing the overall weight by using fewer peltier chips 110. This also reduces the cost of manufacturing.

Figure 3:
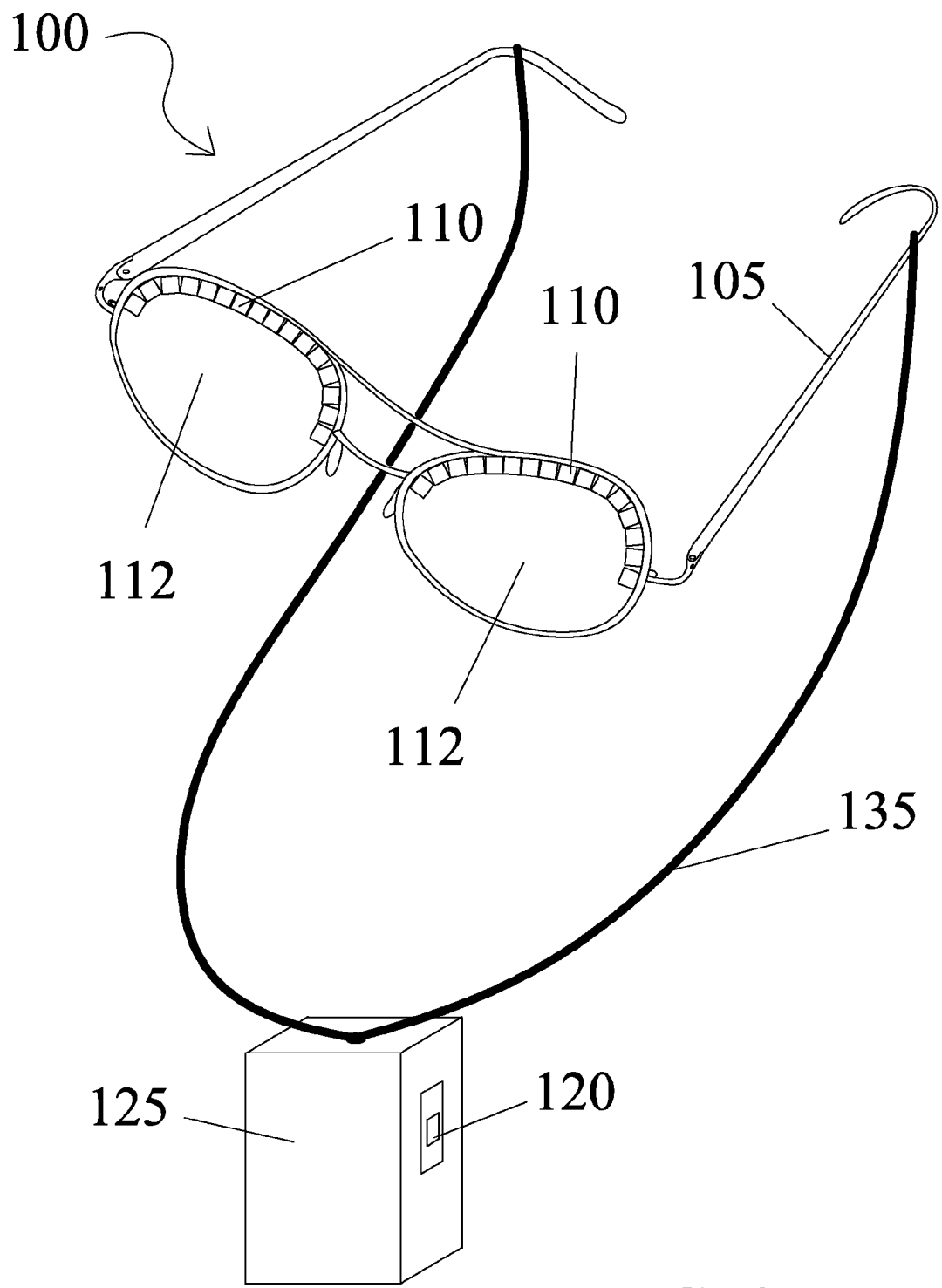
FIG. 3 is an illustration of cooling and heating eyeglasses according to an embodiment of the invention having a combined conductor and neck strap.

Now referring to FIG. 3, cooling and heating eyeglasses 100 is shown having a combined electrical conductor and neck strap 135. In this embodiment, the wires are contained within the neck strap and then the conductors travel inside frame 105 to reach peltier chips 110.

Figure 4:
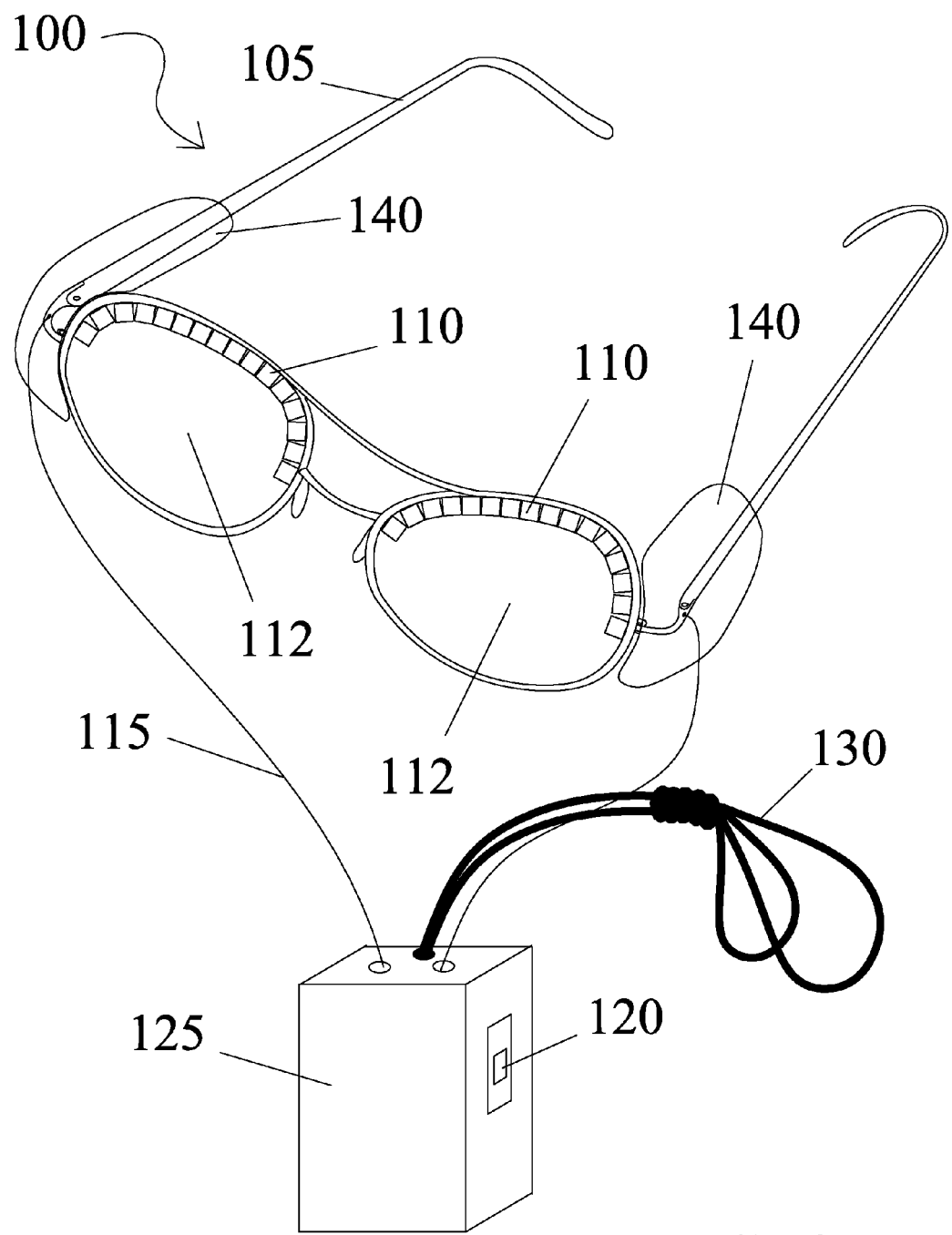
FIG. 4 is an illustration of cooling and heating eyeglasses according to an embodiment of the invention having side shields.

Referring now to FIG. 4, cooling and heating eyeglasses 100 is shown having side shields 140 that serve to further contain and concentrate the cooling effect of peltier chips 110 around the user's eyes.

Figure 5:
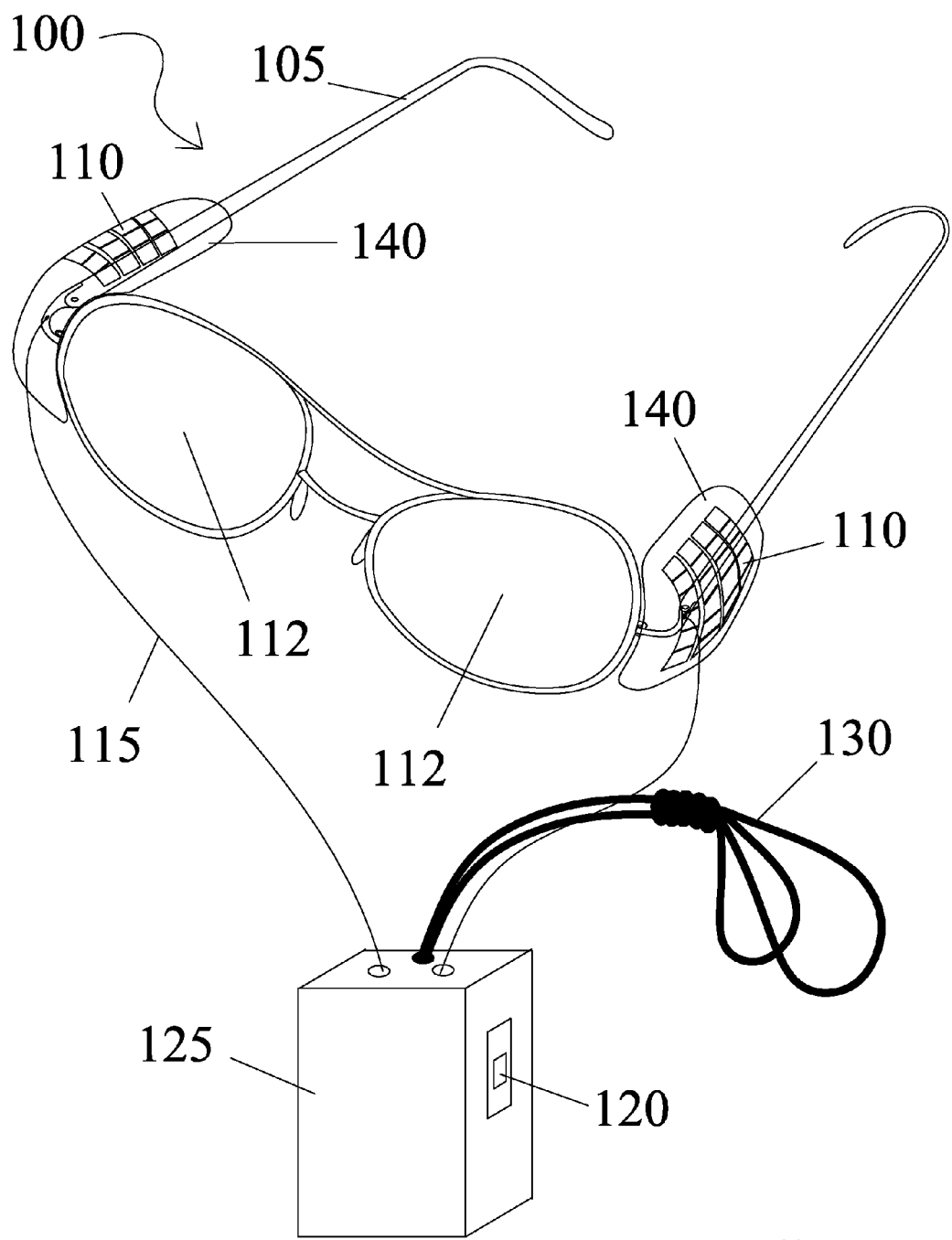
FIG. 5 is an illustration of cooling and heating eyeglasses according to an embodiment of the invention having cooling and heating side shields.

Now referring to FIG. 5, cooling and heating glasses is shown having peltier chips 110 only on side shields 140. In this embodiment, there are no peltier chips on lenses 112. This provides cooling specifically around the temples of the user.

Figure 6:
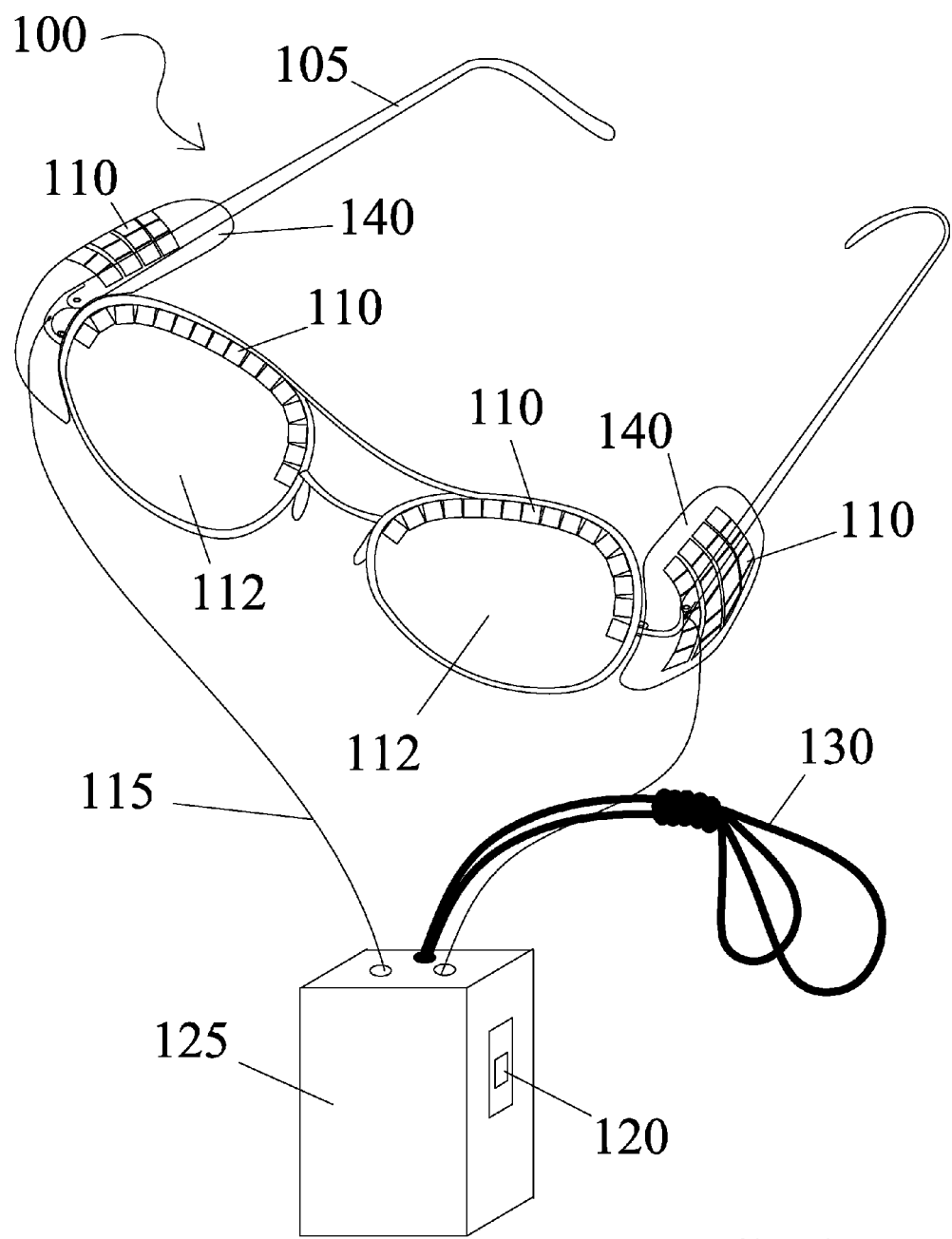
FIG. 6 is an illustration of cooling and heating eyeglasses according to an embodiment of the invention having both cooling and heating around lens and side shields.

Referring to FIG. 6, cooling and heating eyeglasses 100 is shown having peltier chips 110 around the perimeter of lenses 112 and side shields 140. This embodiment provides the maximum cooling effect by providing cooling around the eyes from lens 112 peltier chips 110 and side shield 140 peltier chips 110.

Figure 7:
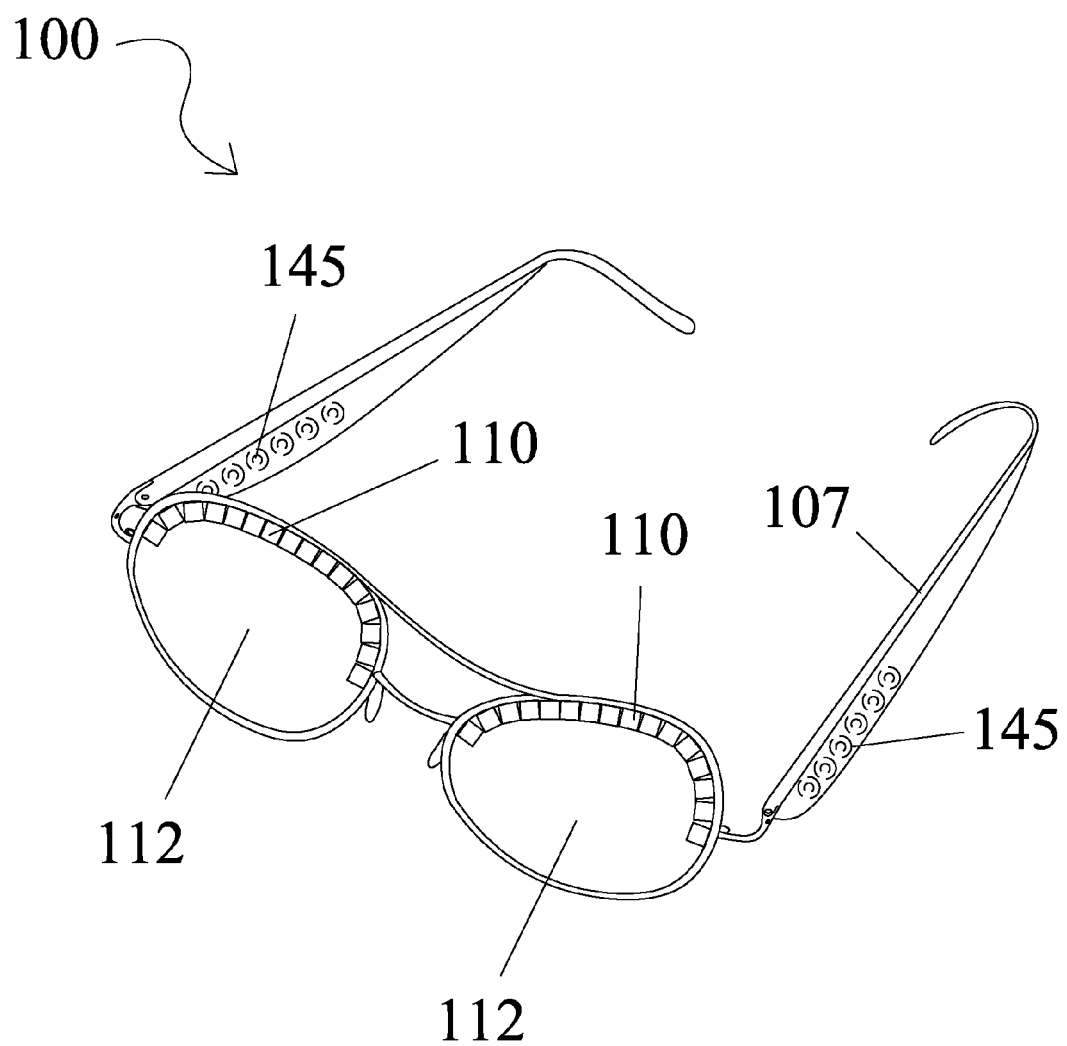
FIG. 7 is an illustration of cooling and heating eyeglasses according to an embodiment of the invention having batteries built into the frame.

Now referring to FIG. 7, cooling and heating eyeglasses 100 is shown having a larger frame 107 that holds a plurality of button type batteries 145 therein. In this embodiment, no external battery pack is needed and also eliminates the need for a neck strap. Button batteries 145 could also be a rechargeable battery pack that fits within frame 107. A recharge port (not shown) could be built in such as a mini USB plug so that the batteries could be recharged by plugging them into a USB port on a computer as is known in the art. It is also within the scope of this invention to provide an inductive recharging system (not shown) where you merely lay the glasses on a tray that inductively interacts with the rechargeable battery as is known in the art.

Of course battery pack 125 could also utilize either replaceable batteries such as AA or AAA or could be a rechargeable pack where the user is provided with a recharging cord to plug in and charge the glasses. The peltier chips may be glued on the inner surface of the lenses. Of course other methods of attaching the chips may be used to fuse the chips to the lenses. All wiring necessary for operation may be connected around an outer edge to reduce any interference with vision.

Because reversing polarity of the electrical energy provided will cause the peltier chips to heat instead of cool, a user can be provided with a selector switch that would switch between cool and heat. Wearing these glasses with cooling modality can prevent the development of eye diseases at the same time prevent the progression of the eye diseases by reducing the production of free radicals and inhibiting their effect. It is well known that the cooling does reduce the production of free radicals and their effect on biological organs such as eyes.

Although the instant invention has been described in relation to particular embodiments thereof, many other variations and modifications and other uses will become apparent to those skilled in the art.

What is claimed is:

1. Cooling and heating eyeglasses comprises:
   an eyeglass frame;
   said eyeglass frame holding lenses therein;
   a plurality of peltier chips directly disposed on an inner surface of at least a portion of a perimeter of said lenses; and
   an electrical energy source in electrical communication with said plurality of peltier chips wherein said peltier chips are energized when said electrical energy source in turned on.

2. The cooling and heating eyeglasses of claim 1 further comprising a pair of side shields disposed on either side of said eyeglass frame.

3. The cooling and heating eyeglasses of claim 2 further comprising a plurality of peltier chips disposed on said side shields.

4. The cooling and heating eyeglasses of claim 1 wherein said electrical energy source is disposed within said eyeglass frame.

5. The cooling and heating eyeglasses of claim 1 wherein said plurality of said peltier chips are directly disposed along said inner surface of an upper portion of said perimeter of said lenses.

6. The cooling and heating eyeglasses of claim 1 further comprising a polarity reversing switch wherein said plurality of peltier chips is switchable from heating and cooling.

* * * * *